United States Patent
Conde Bouza et al.

(10) Patent No.: US 12,319,334 B2
(45) Date of Patent: Jun. 3, 2025

(54) STEERING WHEEL

(71) Applicant: Dalphi Metal Espana S.A., Vigo (ES)

(72) Inventors: Fabián Conde Bouza, Nigrán (ES); Jorge Ollero Ollero, Vigo (ES); Xabier Lema Martínez, A Coruña (ES)

(73) Assignee: Dalphi Metal Espana S.A., Vigo (ES)

(*) Notice: Subject to any disclaimer, the term of this patent is extended or adjusted under 35 U.S.C. 154(b) by 221 days.

(21) Appl. No.: 17/787,476

(22) PCT Filed: Dec. 17, 2020

(86) PCT No.: PCT/EP2020/086784
§ 371 (c)(1),
(2) Date: Jun. 20, 2022

(87) PCT Pub. No.: WO2021/123001
PCT Pub. Date: Jun. 24, 2021

(65) Prior Publication Data
US 2023/0039647 A1   Feb. 9, 2023

(30) Foreign Application Priority Data
Dec. 20, 2019   (DE) .................. 102019135456.0

(51) Int. Cl.
*B62D 1/08*   (2006.01)
*B62D 1/06*   (2006.01)
*B62D 1/11*   (2006.01)

(52) U.S. Cl.
CPC .............. *B62D 1/08* (2013.01); *B62D 1/06* (2013.01); *B62D 1/11* (2013.01)

(58) Field of Classification Search
None
See application file for complete search history.

(56) References Cited

U.S. PATENT DOCUMENTS

| 1,618,137 | A | * | 2/1927 | Roebuck | B62D 1/10 |
| | | | | | 74/552 |
| 2005/0217413 | A1 | * | 10/2005 | Specht | B62D 1/04 |
| | | | | | 74/552 |
| 2017/0369090 | A1 | | 12/2017 | Shimizu et al. | |

FOREIGN PATENT DOCUMENTS

| DE | 2549285 A1 | 5/1977 |
| DE | 19801514 A1 | 10/1998 |
| DE | 60122042 T2 | 12/2006 |
| JP | H06144242 A | 5/1994 |

(Continued)

OTHER PUBLICATIONS

International Search Report and Written Opinion for PCT/EP2020/086784 mailed Mar. 23, 2021 (10 pages; with English translation).

*Primary Examiner* — Vicky A Johnson
(74) *Attorney, Agent, or Firm* — Kristin L. Murphy

(57) ABSTRACT

The disclosure relates to an improvement of a structure of a steering wheel. For this, the disclosure suggests a steering wheel comprising a monolithic steering wheel base body which includes a central area for mounting the steering wheel to a steering mechanism, a steering wheel rim and at least one spoke whose first spoke end abuts on the central area and whose second spoke end abuts on the steering wheel rim. Accordingly, a projection which restricts tilting of the spoke toward a central area to a predetermined extent is formed in an area of a first spoke end.

19 Claims, 3 Drawing Sheets

(56) References Cited

FOREIGN PATENT DOCUMENTS

JP         H10273059 A     10/1998
JP         2005132238 A     5/2005

* cited by examiner

STEERING WHEEL

CROSS-REFERENCE TO RELATED APPLICATIONS

This application is a national stage of International Application No. PCT/EP2020/086784, filed Dec. 17, 2020, the disclosure of which is incorporated herein by reference in its entirety, and which claimed priority to German Patent Application No. 102019135456.0, filed Dec. 20, 2019, the disclosure of which is incorporated herein by reference in its entirety.

TECHNICAL FIELD

The disclosure relates to a steering wheel comprising a monolithic steering wheel base body which includes a central area for mounting the steering wheel to a steering mechanism, a steering wheel rim and at least one spoke whose first spoke end abuts on the central area and whose second spoke end abuts on the steering wheel rim.

BACKGROUND

Modern steering wheels for passenger cars contain a steering wheel base body (also referred to as steering wheel skeleton) which is made monolithically from magnesium or aluminum in a die casting process. They are arranged at an angle with the horizontal in the vehicle.

In connection with steering wheels of automotive vehicles, there exist various tests which the newly designed steering wheels must stand. On the one hand, fatigue defects are tested. Here the steering wheels, especially the steering wheel skeletons, are desired to withstand high long-term stress. Moreover, the steering wheels, especially the steering wheel skeletons, are required to have an adapted flexural stiffness, as during the crash test the steering wheel rim supported by the spokes is only allowed to offer a standardized resistance to body contact with a dummy.

In order to achieve this, the spoke frequently must be designed such that it can bend or buckle. However, especially in the connecting area of the spokes to the steering wheel rim, the spoke must not break.

When designing steering wheels whose steering wheel base body (also referred to as steering wheel skeleton) is manufactured by injection molding, it can turn out to be difficult to design the spokes such that they meet these requirements, especially when further switch elements have to be attached and particular requirements to the appearance have to be met.

SUMMARY

Therefore, what is needed is an improved steering wheel which meets the requirements described above.

For a steering wheel of the type mentioned in the beginning, according to a first exemplary arrangement of the disclosure, a projection which restricts tilting of the spoke toward a central area to a predetermined extent is formed in an area of the first spoke end.

With this configuration, the spoke can be prevented from bending, when it impacts on the steering wheel rim, so far that it ruptures at the steering wheel rim.

According to another exemplary arrangement, the projection is formed at the spoke on its side facing the central area. In this way, the projection can be arranged at a location of the steering wheel base body where other steering wheel components are not obstructed.

According to another exemplary arrangement, in the area of the first spoke end at the central area, a stop, which may be in the form of a coupling unit for an airbag module, is configured such that there is a gap between the projection and the stop.

In this way, only small changes have to be made to the central area. Moreover, the distance by which the spoke is allowed to move in the case of crash can be easily determined by determining the gap width.

According to another exemplary arrangement, the projection extends transversely to a main construction direction of the first spoke section only over less than one third of the width of the first spoke section. In one exemplary arrangement, the projection is centrally arranged.

The placement of the projection helps to achieve the desired effect in an especially material-saving manner.

In accordance with another exemplary arrangement, the spoke has a first spoke section, the main construction direction of the first spoke section and the main construction plane of the central area enclosing an angle $\beta$ that ranges from 40° to 80°. In one exemplary arrangement, angle $\beta$ ranges from 50° to 75°.

Thus, the attachment area of the spoke on the central area acts like a hinge which, in the case of crash, when force is applied to the steering wheel rim, permits the spoke to tilt or fold at the attachment area but prevents shearing or breaking.

According to another exemplary arrangement, the spoke includes a first spoke section and a second spoke section, the main construction direction of the first spoke section and the main construction direction of the second spoke section enclosing an angle $\alpha$ that ranges from 30° to 70°. In another exemplary arrangement, the angle $\alpha$ ranges from 40° to 60°.

Thus the transition area of the spoke between the first spoke section and a second spoke section acts like a hinge which, in the case of crash, allows folding of the spoke or the two spoke sections toward each other so that the spoke can yield, when force is applied to the steering wheel rim, but shearing or breaking off the steering wheel rim is prevented.

According to another exemplary arrangement, the spoke is substantially S-shaped along its main construction directions, viz. changes its curvature path from its attachment point at the central area to its attachment location at the steering wheel rim several times, especially from an anti-clockwise curvature to a clockwise curvature and again to an anti-clockwise curvature.

In this way, the spoke can yield when force is applied to the steering wheel rim, but it is prevented from shearing or breaking off the steering wheel rim.

In accordance with another exemplary arrangement, in a transition area from the first spoke section to the second spoke section, at least one reinforcing structure is formed which extends along the main construction directions of the spoke on its side facing the central area.

Since, due to the afore-described design of the spoke, the outer sides of the two spoke sections fold toward each other, when force is applied to the steering wheel rim, wherein the transition area between the first spoke section and a second spoke section acts like a hinge, tensile stresses will occur on the inner side of the spoke at said transition area. By providing the reinforcing structure the stiffness and thus the bending behavior and, resp., the resistance to the application of force at the steering wheel rim can be adjusted.

According to another exemplary arrangement, at the second spoke section at least one receiving location or, resp., coupling unit for operating elements is formed.

This enables the required operating elements to be reliably connected to the steering wheel base body.

According to another exemplary arrangement, at least one recess is provided at the second spoke section.

Thus, it is possible to save weight and material on the steering wheel base body. Also, the bending behavior of the spoke can be additionally adjusted.

According to another exemplary arrangement, at least two spokes are provided, wherein said spokes are connected, in the mounting state of the steering wheel at a steering angle of 0°, to the steering wheel rim at 90° and at 270°. Furthermore, another spoke is contemplated at 180°, for example at the bottom.

This arrangement allows for a safe connection of the central area to the steering wheel rim.

In accordance with another exemplary arrangement, the steering wheel base body includes a foam wrapping and is optionally provided with a coating (made from leather and/or wood) of at least the steering wheel rim and/or (parts) of the spoke, wherein operating elements, a steering wheel heating and/or a sensor unit are provided. An airbag module may be provided as well.

Thus, a steering wheel that meets the latest requirements to user friendliness and safety can be provided.

Further features are the subject matter of the subclaims.

BRIEF DESCRIPTION OF DRAWINGS

Hereinafter, further details and features of the disclosure shall be illustrated by way of example arrangements with reference to the drawing, wherein.

DETAILED DESCRIPTION

Figure 1:
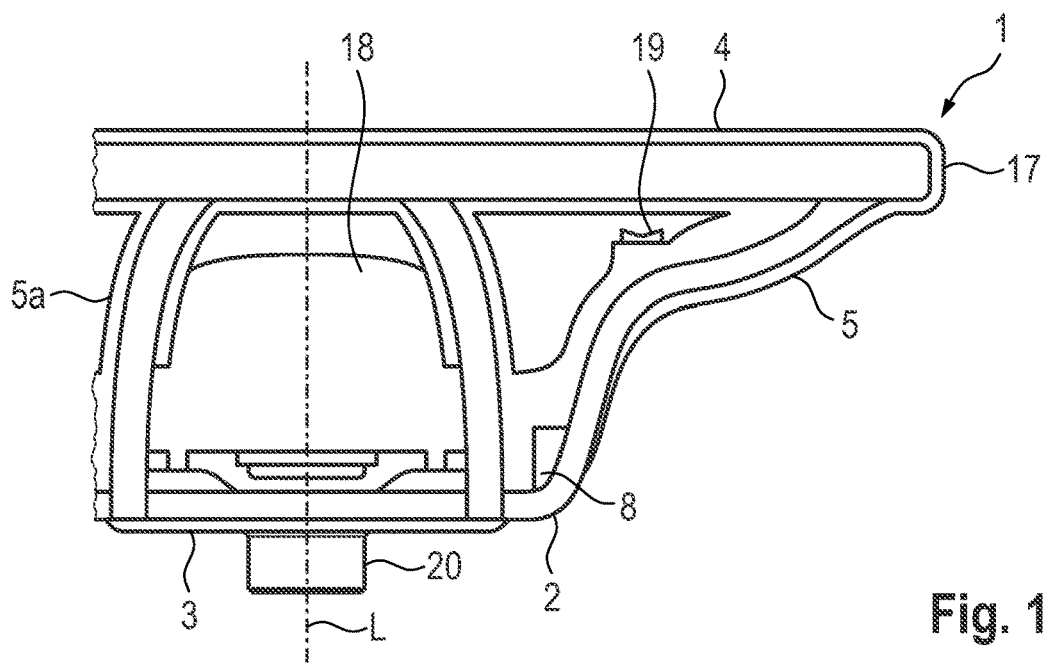
FIG. 1 shows a schematic partial view (from the bottom) of an exemplary arrangement of a steering wheel according to the disclosure.

In FIG. 1, an embodiment of the steering wheel 1 according to the invention is schematically shown. As illustrated, the steering wheel 1 detailed in the following is provided with a foam wrapping 17 in the area of its main spokes (hereinafter: spoke) 5, its optional auxiliary spokes 5a and the steering wheel rim. The surface of the foam wrapping may be provided completely or partially with a coating, preferably made from leather and/or wood.

Figure 3:
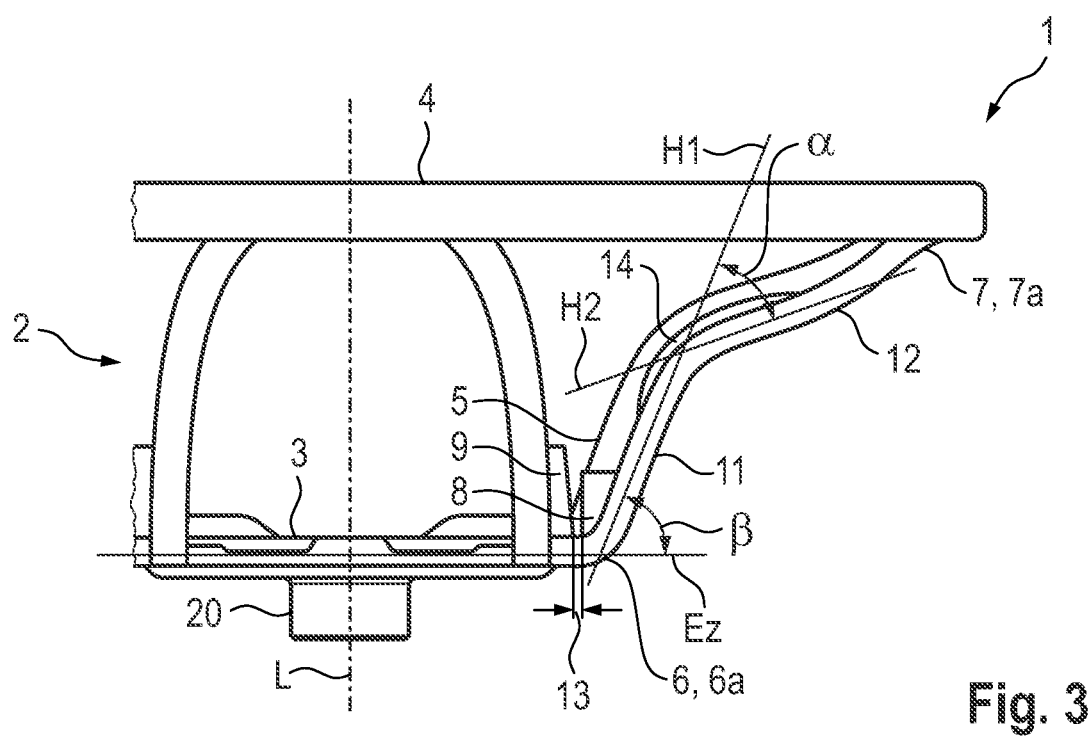
FIG. 3 shows a lateral partial view of the exemplary arrangement of the steering wheel according to the disclosure.

At the spokes, a steering wheel 1 may be equipped with various operating elements 19. Also, a steering wheel heating and/or a sensor unit may complete the steering wheel 1. As shown in FIG. 3, a steering wheel base body 2 is manufactured monolithically as a light alloy cast part, made from aluminum or magnesium alloy, and in its center has a hub 20 via which the steering wheel 1 can be mounted to a steering rod or a steering mechanism.

An imaginary steering axle L extends through the center of the hub. Perpendicularly thereto extends a main construction plane Ez of the central area 3 of the steering wheel base body 2. In the main construction plane Ez, at least one, and in one exemplary arrangement two, and where appropriate also three or four spokes 5, supporting a steering wheel rim 4 are connected laterally from the central area 3.

In the shown exemplary arrangement, the spokes 5 are substantially S-shaped and thus have a curvature path which changes from their attachment area 6a at the central area 3 to their attachment point 7a at the steering wheel rim 4 several times, especially from an anti-clockwise curvature to a clockwise curvature and again to an anti-clockwise curvature.

In this way, the spoke 5 can yield, as explained in detail by way of FIG. 4 below, when force is applied to the steering wheel rim 4, but is prevented from shearing or breaking off the steering wheel rim 4.

In detail, the spoke 5 is provided to have a first spoke section 11, wherein a main construction direction H1 of the first spoke section 11 and the main construction plane Ez of the central area 3 enclose an angle β that ranges from 40° to 80°. In one exemplary arrangement, the angle β ranges from 50° to 75°. In the shown exemplary arrangement, the angle β=70°.

It is further provided that adjacent to the first spoke section 11 the spoke includes a second spoke section 12, wherein the main construction direction H1 of the first spoke section 11 and the main construction direction H2 of the second spoke section 12 enclose an angle α that ranges from 30° to 70°. In one exemplary arrangement, the angle α ranges from 40° to 60°. In the shown exemplary arrangement, the angle α=50°.

As illustrated in FIGS. 1 to 4, in area 6 of the first spoke end, a projection 8 is formed which projects approximately centrally on an inner side of the spoke 5. In one exemplary arrangement, the projection is anvil-shaped. Opposite thereto, a stop 9 is formed at the central area 3 equally in the area 6 of the first spoke end. A gap 13 is present between the projection 8 formed at the spoke 5 and the stop 9. Said gap may be wedge-shaped or may have parallel gap walls. The width of the gap 13 between the projection 8 and the stop 9 determines the extent by which the first spoke section 11 may tilt about its attachment area 6a toward the central area 3, when pressure is applied to the spoke 5 (from the steering wheel rim 4).

In one exemplary arrangement, a rear of a coupling unit 10 for an airbag module, especially of a detent hook provided at the central area, may act or be designed as a stop 9.

Figure 2:
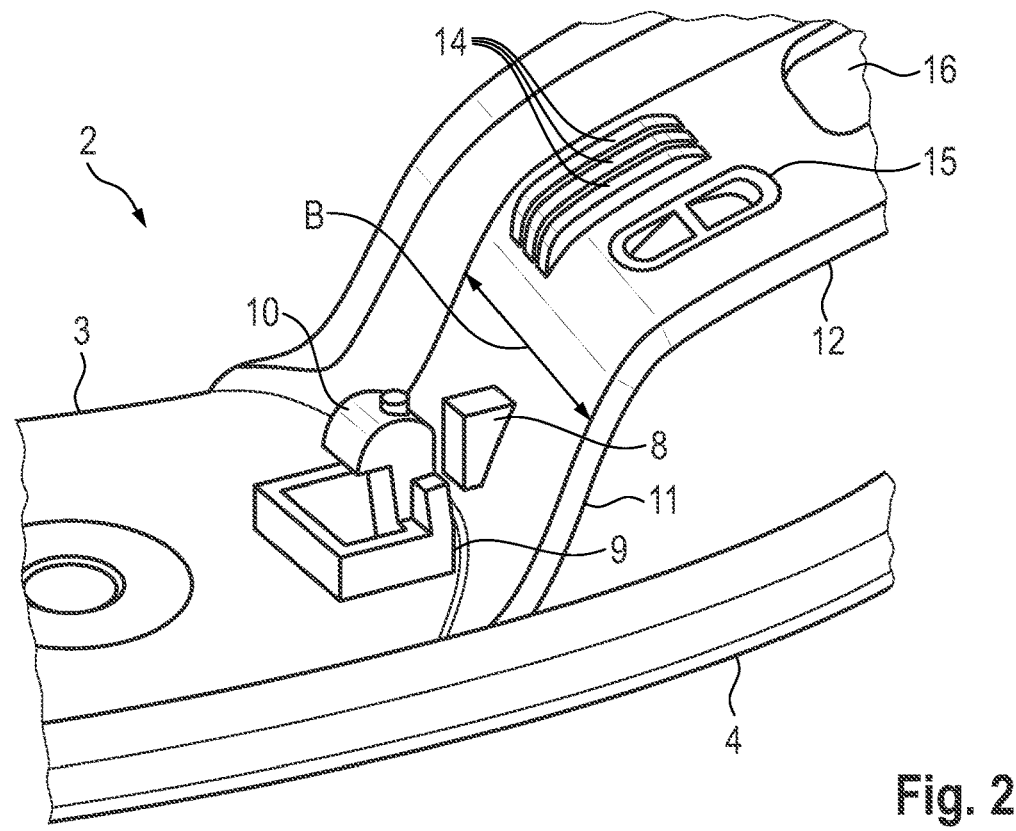
FIG. 2 shows a perspective partial view of an exemplary arrangement of a steering wheel base body of the steering wheel according to the disclosure.

As is best visible from FIGS. 2 and 3, in a transition area from the first spoke section 11 to the second spoke section 12 at least a reinforcing structure 14 extending along main construction directions H1, H2 of the spoke 5 on its (inner) side facing the central area 3.

The number (three in the shown exemplary arrangement) and the respective width and height of the provided reinforcing structures 14 help to adjust the stiffness and thus the bending behavior and, resp., the resistance to the application of force at the steering wheel rim 4.

Figure 4:
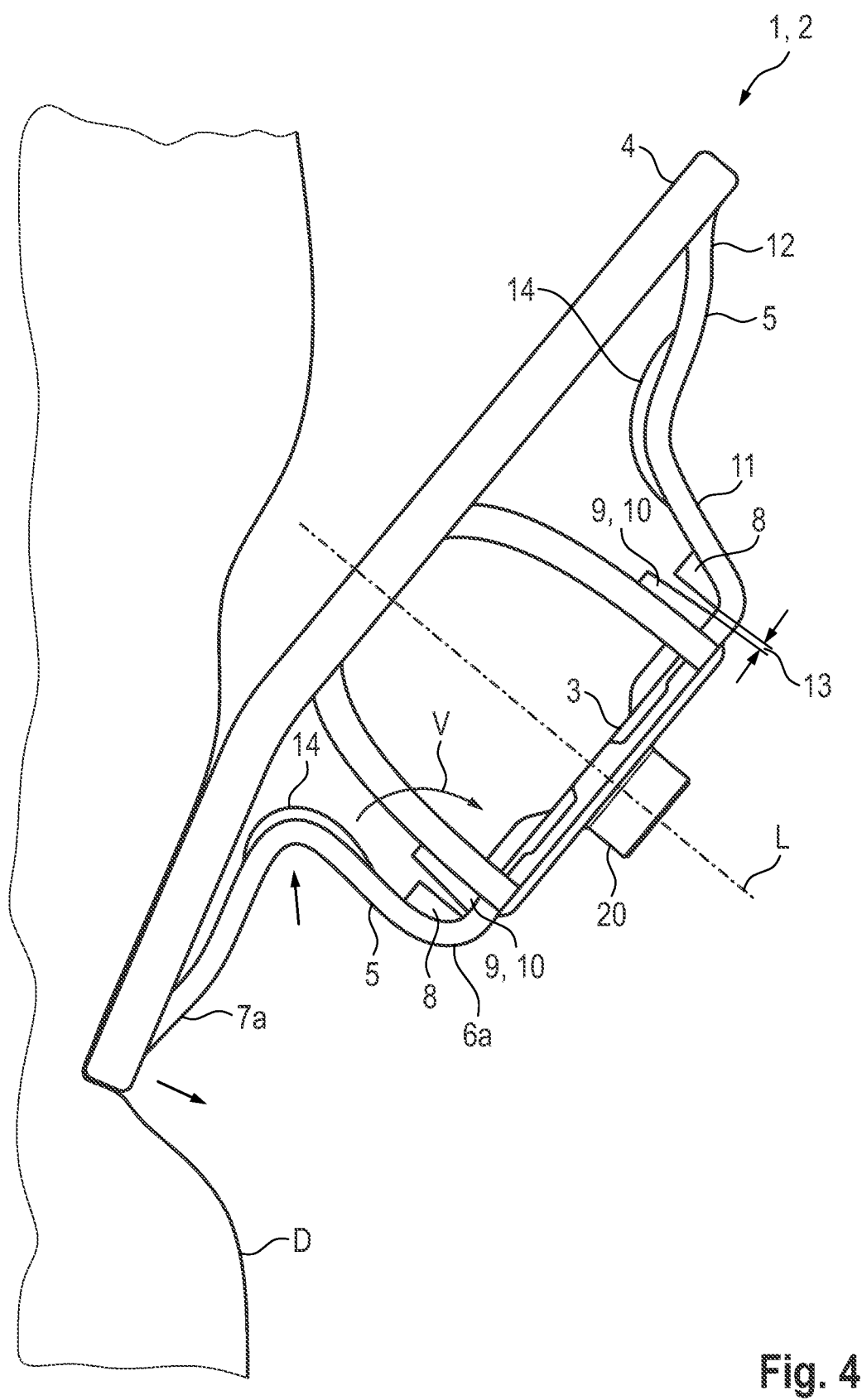
FIG. 4 shows a schematic view of the steering wheel base body of the steering wheel according to the disclosure during a crash test.

In FIG. 4, for further explanation of the disclosure, a crash test in which a dummy body D impacts on the steering wheel rim 4 of a steering wheel base body 2 of the steering wheel 1 according to the disclosure is shown.

The illustrated impact of the dummy body D causes strong force effect on the steering wheel rim 4, resulting in the latter to deform predominantly in the direction of the steering axis L. At the attachment point 7a of the upper spoke section 12 said force impacts on the spoke 5. In a conventional spoke, at least theoretically a break at one of the attachment points 6a or 7a is imaginable, when the spoke 5 is excessively bent.

Providing a bending control member 8, i.e, the projection, according to the disclosure can help prevent the spoke from breaking in the critical regions. By restricting the bending of the spoke at its attachment points 6a and 7a, tensions exceeding the yield point of the material can be avoided at the outer areas of the loaded attachment points 6a and 7a of the spoke 5.

For absorbing the force applied, the spoke 5 is caused to bend in a controlled manner at the transition area from the first spoke section 11 to the second spoke section 12. The described configuration of the spoke 5 helps to fold the outer sides of the two spoke sections 11, 12 toward each other, when force is applied to the steering wheel rim 4, wherein the transition area between the first spoke portion 11 and a second spoke section 12 acts like a hinge. Also, the angle α between the main construction directions H1 and H2 of the spoke contributes hereto.

The reinforcing structures 14 are provided to adjust the bending behavior based on the tensile stresses occurring at this transition area.

The invention claimed is:

1. A steering wheel comprising a monolithic steering wheel base body which includes a central area for mounting the steering wheel to a steering mechanism, a steering wheel rim and at least one spoke whose first spoke end abuts on the central area and whose second spoke end abuts on the steering wheel rim, wherein in an area of the first spoke end, a projection is formed which restricts tilting of the spoke toward the central area to a predetermined extent; wherein the projection extends transversely to a main construction direction of a first spoke section only over less than one third of a width of the first spoke section.

2. The steering wheel according to claim 1, wherein the projection is formed at the spoke on its side facing the central area.

3. The steering wheel according to claim 2, wherein in the area of the first spoke end at the central area, a stop is configured such that there exists a gap between the projection and the stop.

4. The steering wheel according to claim 1, wherein in the area of the first spoke end at the central area, a stop is configured such that there exists a gap between the projection and the stop.

5. The steering wheel according to claim 4 wherein the stop is configured in the form of a coupling unit for an airbag module.

6. The steering wheel according to claim 1, wherein the spoke includes a first spoke section, wherein a main construction direction of the first spoke section and a main construction plane of the central area enclose an angle that ranges from 40° to 80°.

7. The steering wheel according to claim 6, wherein the spoke has a first spoke section and a second spoke section, wherein a main construction direction of the first spoke section and a main construction direction of the second spoke section enclose an angle that ranges from 40° to 60°.

8. The steering wheel according to claim 1, wherein the spoke has a first spoke section and a second spoke section, wherein a main construction direction of the first spoke section and a main construction direction of the second spoke section enclose an angle that ranges from 30° to 70°.

9. The steering wheel according to claim 8, wherein the angle ranges from 40° to 60°.

10. The steering wheel according to claim 8, wherein a transition area from the first spoke section to the second spoke section, at least one reinforcing structure is formed which extends along the main construction directions of the spoke on its side facing the central area.

11. The steering wheel according to claim 10, wherein at the second spoke section at least one recess is provided.

12. The steering wheel according to claim 10, wherein a coupling unit for operating elements is configured.

13. The steering wheel according to claim 10, wherein at the second spoke section at least one receiving point is configured.

14. The steering wheel according to claim 1, wherein at least two spokes are provided, wherein these spokes are connected, in the mounting state of the steering wheel at a steering angle of 0°, to the steering wheel rim at 90° and at 270°.

15. The steering wheel according to claim 1, wherein the steering wheel base body includes a foam wrapping and/or wherein operating elements.

16. The steering wheel according to claim 1, wherein the projection is centrally arranged.

17. The steering wheel according to claim 1, wherein the spoke includes a first spoke section, wherein the main construction direction of the first spoke section and the main construction plane of the central area enclose an angle that ranges from 50° to 75°.

18. A steering wheel comprising a monolithic steering wheel base body which includes a central area for mounting the steering wheel to a steering mechanism, a steering wheel rim and at least one spoke whose first spoke end abuts on the central area and whose second spoke end abuts on the steering wheel rim, wherein in an area of the first spoke end, a projection is formed which restricts tilting of the spoke toward the central area to a predetermined extent; wherein the steering wheel base body includes a foam wrapping and/or operating elements.

19. The steering wheel according to claim 18, wherein a coating is included of at least the steering wheel rim and/or the spoke.

* * * * *